United States Patent [19]

Clapis et al.

[11] Patent Number: 5,555,472
[45] Date of Patent: Sep. 10, 1996

[54] METHOD AND APPARATUS FOR MEASURING FILM THICKNESS IN MULTILAYER THIN FILM STACK BY COMPARISON TO A REFERENCE LIBRARY OF THEORETICAL SIGNATURES

[75] Inventors: Paul J. Clapis, Sandy Hook; Keith E. Daniell, Norwalk, both of Conn.

[73] Assignee: Integrated Process Equipment Corp., Phoenix, Ariz.

[21] Appl. No.: 179,594

[22] Filed: Dec. 22, 1993

[51] Int. Cl.⁶ ............................................. G01B 9/02
[52] U.S. Cl. ........................................ 356/357; 356/355
[58] Field of Search ............................ 356/357, 359, 356/360, 355, 381, 382

[56] References Cited

U.S. PATENT DOCUMENTS

| | | | |
|---|---|---|---|
| 5,042,949 | 8/1991 | Greenberg et al. | 356/359 |
| 5,291,269 | 3/1994 | Ledger | 356/357 |
| 5,337,150 | 8/1994 | Mumola | 356/357 |
| 5,365,340 | 11/1994 | Ledger | 356/357 |

*Primary Examiner*—Samuel A. Turner
*Attorney, Agent, or Firm*—Cahill, Sutton & Thomas P.L.C.

[57] ABSTRACT

The thicknesses of a first layer and of a second layer on a semiconductor wafer can be measured together by assuming that the second layer has a substantially uniform thickness. The thicknesses are measured by measuring reflectivity as a function of wavelength at a plurality of points on the wafer to provide a plurality of signatures, comparing each signature with signatures from libraries of theoretical signatures by calculating an error value associated with each signature; and determining the minimum error value. Each library is based upon a unique assumed thickness of the second layer. Thus, the thickness of the second layer is determined by identifying the library associated with the minimum error value.

15 Claims, 3 Drawing Sheets

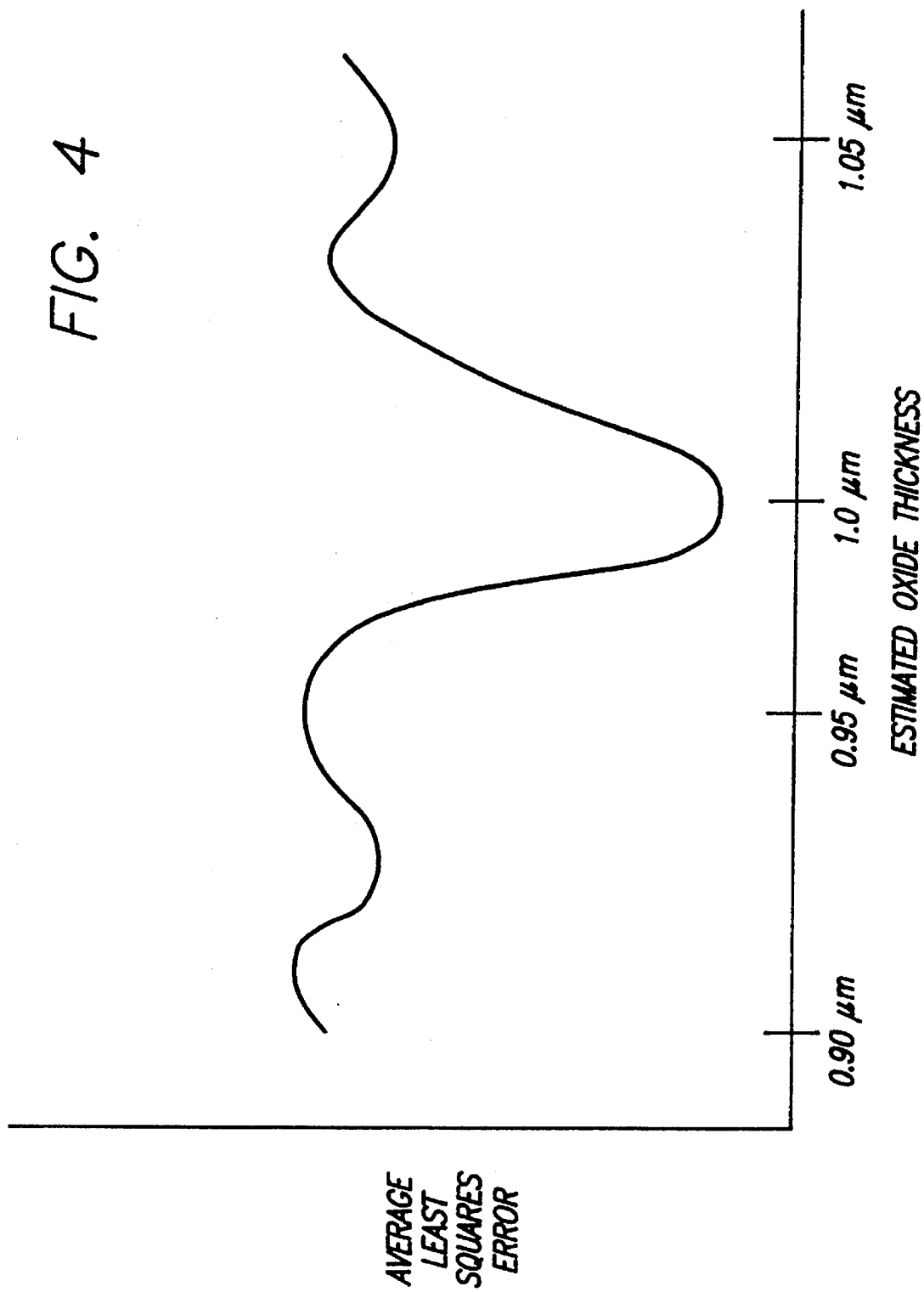

METHOD AND APPARATUS FOR MEASURING FILM THICKNESS IN MULTILAYER THIN FILM STACK BY COMPARISON TO A REFERENCE LIBRARY OF THEORETICAL SIGNATURES

BACKGROUND OF THE INVENTION

1. Field of the Invention

The present invention relates to apparatus and method for fabricating thin films. More specifically, the present invention relates to a method and apparatus for measuring the thickness of thin films.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

A silicon-on-insulator (SOI) semiconductor wafer typically includes a sandwich structure fabricated by growing a silicon dioxide film on one surface of each of two silicon wafers and bonding the two silicon dioxide film surfaces together at high temperature. Other materials such as, for example, silicon nitride, may be used for the insulator material and other materials may be used for the wafer material. One of the two outer silicon surfaces of the sandwich structure is typically mechanically ground and polished to an average thickness of several microns. This mechanical process unfortunately results in large spatial variations in the thickness of this outer silicon layer over the surface of the wafer. To reduce these spatial variations, a thickness error map that indicates thickness non-uniformities of this outer silicon layer over the entire wafer surface, is typically required for subsequent manufacturing operations, e.g. micro-polishing. The steps of measuring the spatial variations in the thickness of the outer silicon layer followed by thinning and smoothing the surface by micropolishing may need to be performed several times before the entire outer silicon layer achieves the desired thickness. In order to reduce costs and increase production, a measurement of at least 400 points on a wafer surface in 60 seconds is desirable.

Current commercial instruments, however, typically provide film thickness measurements at only a single point on a surface. These instruments use a focused lens or a fiber bundle to locally illuminate the film surface with a beam of monochromatic light. A grating or prism spectrograph is typically used to measure the surface spectral reflectance at each point. This surface spectral reflectance data must be numerically corrected due to variations in the angle of incidence caused by the illuminating beam f-number.

These commercial instruments may be extended to cover the entire wafer surface by moving either the measuring instrument or the wafer in a controlled manner. However, the time required for these instruments to determine the thin film layer thickness at a single point is on the order of one minute. Further, characterizing an entire film surface of at least 400 measurement points far exceeds the time typically afforded for efficient wafer production.

The need in the art for a faster system and technique for measuring the thickness of thin films is addressed by the invention of two copending U.S. Patent Applications entitled, APPARATUS AND METHOD FOR MEASURING THE THICKNESS OF THIN FILMS, Ser. No. 07/804,872 filed Dec. 6, 1991 and Ser. No. 07/987,926 filed Dec. 10, 1992, by Anthony M. Ledger and assigned to the present Assignee. This application discloses an electro-optical imaging system for efficiently determining a thin film layer thickness of, for example, a wafer over a full aperture. Non-uniformities in this layer thickness are obtained by measuring the reflectance characteristics for a full aperture of a wafer surface and comparing this measured reflectance data to reference reflectance data by using numerical iteration or by using a calibration wafer having known layer thicknesses.

To efficiently measure the reflectance characteristics of a wafer layer, a filtered white light source is used to produce a sequence of collimated monochromatic light beams at several different wavelengths. These collimated monochromatic beams are individually projected onto the entire surface of the wafer, and coherent interactions occur between this light as it is reflected from the physical boundaries in the wafer structure. As a result of these interactions an interference fringe pattern is formed on the surface of the wafer for each projected beam and, consequently, for each wavelength. A reflected image of each fringe pattern is projected onto a detector array of, for example, a charge coupled device (CCD) camera, where the full aperture of this image is then captured. The fringe pattern image is captured by digitizing pixels in the CCD camera detector array corresponding to the image present. A reflectance map of the entire wafer surface is generated from this captured fringe pattern image. Several reflectance maps are generated from each measured wafer to eliminate thickness ambiguities which may result from outer layers having phase thicknesses greater that $2\pi$.

The reference reflectance data for a wafer may be obtained by a theoretical calculation or through the use of a calibration wafer. The theoretical method consists of numerically computing reference reflectance characteristics based on assumed values for the intrinsic optical properties of the wafer materials. Alternatively, a calibration wafer, having a known thickness profile, may be constructed from the same batch of materials used to construct the wafer to be measured. By subjecting this calibration wafer to the measuring method of the present invention, reference reflectance data is obtained for the known wafer.

The comparison between the measured reflectance data and the reference reflectance data can then be performed by a computer. The computer can then provide a mapping of layer thickness or a mapping of layer thickness non-uniformities over a full aperture of the wafer.

While this invention represents a substantial advance in the state of the art, it is limited in the measurement of multi-layer film stacks. For multi-layer film stacks, film stack reflectivity is measured as a function of incident wavelength for a large number of physical locations. The "signature" of reflectivity vs. wavelength is then compared to a "library" of such signatures, each generated from theoretical predictions for a slightly different thickness of one layer in the stack. The library is essentially a column of data based on a theoretical prediction of the thickness of one layer. The library is normally generated with a fixed thickness for all other films in the stack. The best match to this library is determined by minimizing to the least squares error.

Using this technique, measurement of the thickness of two layers of thin films requires that the thickness of one layer be known along with the index of refraction 'n' and the imaginary index of refraction 'k' for both layers. Unfortunately, in many applications, there is a need in the art for a system and technique for measuring the thickness of two adjacent thin film layers in a multi-layer film stack where the thickness of both layers is unknown.

SUMMARY OF THE INVENTION

The need in the art is addressed by the system and technique of the present invention for measuring the thickness of two layers of material where one of the layers may be assumed to have substantially uniform thickness. The novel method includes the steps of:

a) providing a first reference library of theoretical signatures of reflectivity as a function of wavelength for a range of thicknesses of the first layer on the basis of a first assumed thickness of the second layer;

b) measuring reflectivity as a function of wavelength for the first layer at plural points on the surface of the first layer to provide a plurality of signatures representing the measured value of reflectivity as a function of wavelength at each point measured;

c) comparing each of the measured signatures to each of the theoretical signatures in the first reference library to identify an associated optimal correlation for each measured signature;

d) calculating an error value associated with each optimal correlation of each signature with one of the theoretical signatures in the reference library; and e) analyzing the error value associated with each optimal correlation of each signature with one of the theoretical signatures in the reference library to provide a first measure of a quality of the correlation between the actual thickness of the second layer and the first assumed thickness of the second layer;

f) providing plural reference libraries of theoretical signatures of reflectivity as a function of wavelength for a range of thicknesses of the first layer on the basis of plural associated assumed thicknesses of the second layer;

g) comparing each of the measured signatures to each of the theoretical signatures in the reference library associated with each assumed thickness of the second layer to identify an associated optimal correlation for each measured signature in relation to each reference library;

h) calculating an error value associated with each optimal correlation of each signature with one of the theoretical signatures in the each reference library;

i) analyzing the error value associated with each optimal correlation of each signature with one of the theoretical signatures in each reference library to provide a measure of quality of a correlation between the actual thickness of the second layer and each assumed thickness of the second layer;

j) comparing the measures of the quality of correlation between the actual thickness of the second layer and each assumed thickness of the second layer to identify an optimum reference library which represents the most likely estimate of the thickness of the second layer; and k) determining the thickness of the first layer based on the optimal correlations of each measured signature to the signatures of the optimum reference library.

In the illustrative embodiment, the step of calculating an error value associated with each optimal correlation of each signature with one of the theoretical signatures in a reference library includes the step of calculating a least squares error. In addition, in the illustrative embodiment, the step of analyzing the error value associated with each optimal correlation of each signature with one of the theoretical signatures in the reference library to provide a measure of a quality of a correlation between the actual thickness of the second layer and the assumed thickness of the second layer includes the step of computing the average of the least squares error. Further, in the illustrative embodiment, the step of comparing the measures of the quality of correlation between the actual thickness of the second layer and each assumed thickness of the second layer to identify an optimum reference library which represents the most likely estimate of the thickness of the second layer includes the step of determining when the average least squares error approaches a minimum over the values thereof associated with the plural reference libraries of theoretical signatures of reflectivity as a function of wavelength for a range of thicknesses of the first layer on the basis of plural associated assumed thicknesses of the second layer.

BRIEF DESCRIPTION OF THE DRAWINGS

FIG. 4 is a plot of average least squares error as a function of estimated oxide thickness in an SOI wafer.

DESCRIPTION OF THE INVENTION

Figure 1:
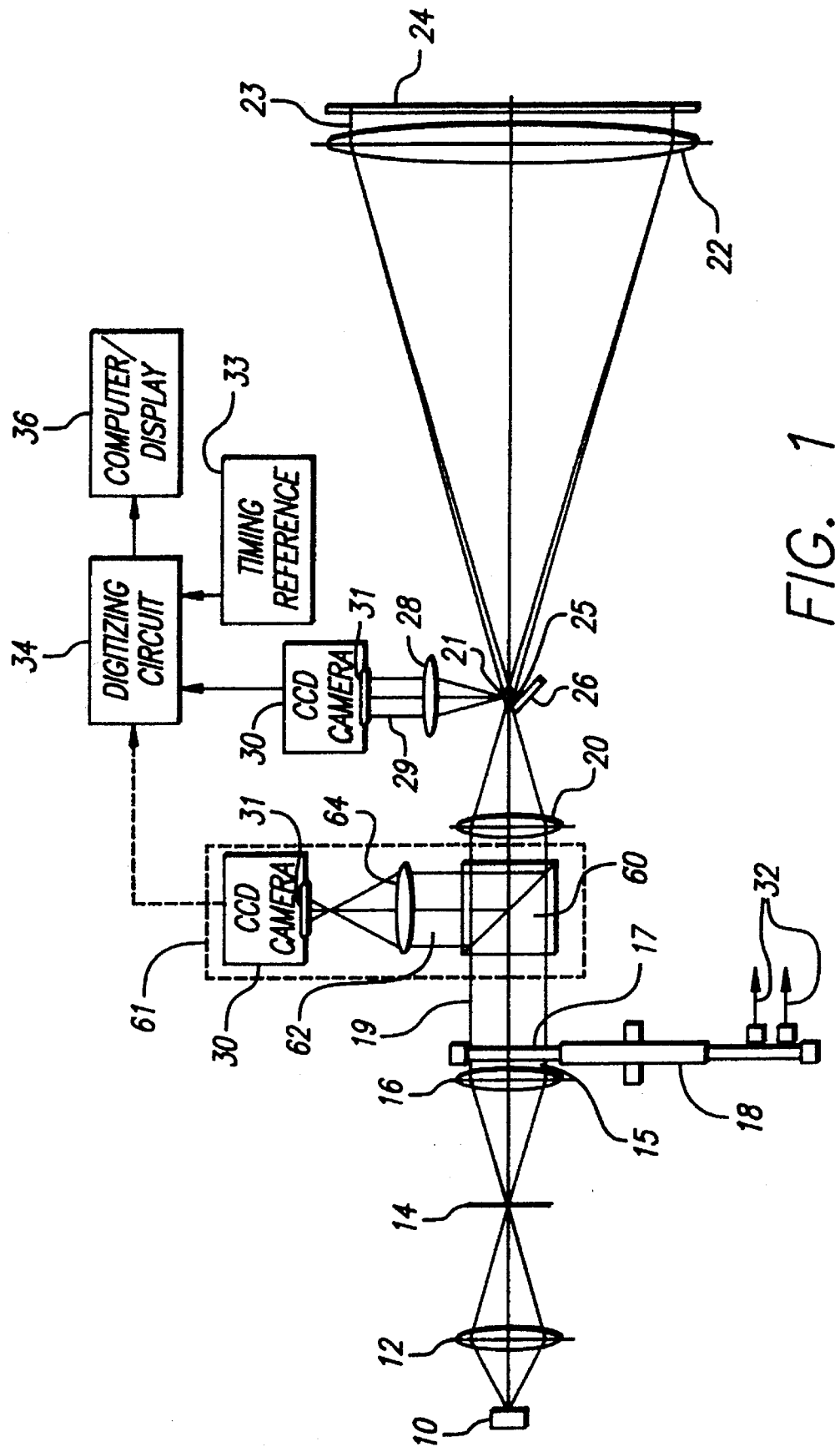
FIG. 1 is a schematic representation of a wafer layer thickness measuring instrument.

An electro-optical system for measuring a layer thickness of a wafer 24 is shown in FIG. 1. For the purposes of this description, the measurement of an outer silicon layer of a SOI semiconductor wafer 24 is described.

A white light source is provided consisting of a circular aperture 14 illuminated by a halogen lamp 10 and a condensing lens 12. Light passing through aperture 14 impinges on a collimator lens 16 to form a beam 15 of collimated light. The size of the aperture 14 determines the field angles in the collimated light sections of the optical system and the orientation is chosen to allow an aperture image to be projected onto the SOI wafer 24. It should be noted that the condensing lens 12 may be replaced by the fiber optic light guide.

The white light source is spectrally filtered by a series of narrow band filters 17, nominally of 30 to 50 angstroms half-bandwidth, placed in the collimated beam 15. The series of filters 17 are placed around the periphery of a rotating filter wheel assembly 18, whereby a corresponding series of collimated monochromatic light beams are produced. The wavelengths of these collimated monochromatic light beams 19 may typically range from 550 nm to 950 nm. Locating the filter wheel assembly 18 in a collimated light section 15 minimizes the spectral broadening of the filtered beam 19 caused by the field angle defined by the size of the aperture 14. A pair of electronic signals 32 are generated by the filter wheel assembly 18 to serve as a timing reference 33 for a digitizing circuit 34. One of these signals indicates the beginning of a filter wheel revolution, whereas the other signal indicates the beginning of each filter period.

A second collimator lens 20 forms a monochromatic image of the aperture 14 about a point 21 in a focal plane of a third collimator lens 22. This third collimator lens 22 produces a collimated beam 23 which illuminates the full aperture of the 100 millimeter diameter SOI wafer 24. Also, an extension of this wafer illumination technique to wafers of 150 millimeters or 200 millimeters in diameter requires that the size of the third collimator lens 22 match the wafer size. It should be noted that a monochromator can replace the halogen lamp 10, the condensing lens 12, the first two collimator lenses 16, 20, and the narrow band filter wheel 18, provided that the slewing rate of the monochromator between different wavelengths is sufficiently high, up to twenty different wavelengths in less than one second per wavelength.

Figure 2:
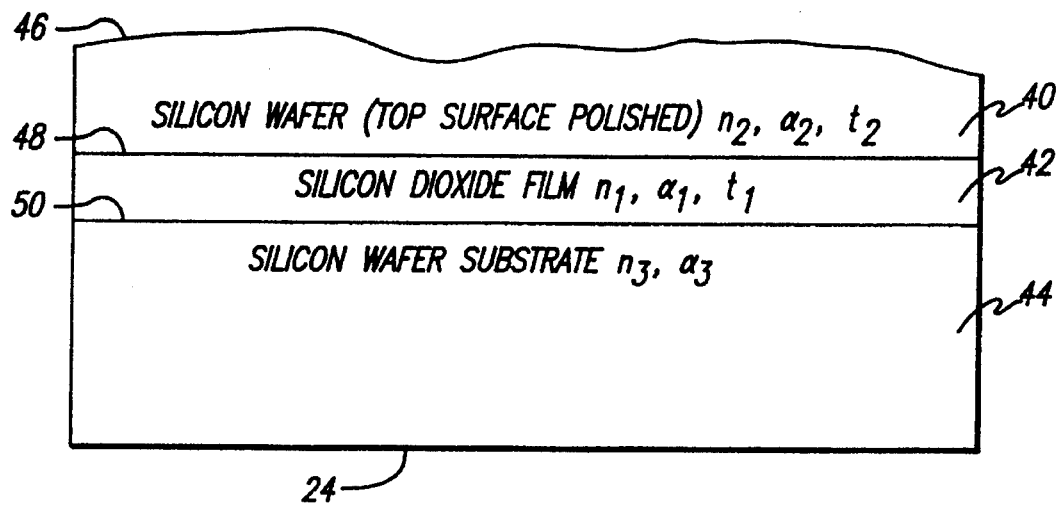
FIG. 2 is a cross-sectional view of an SOI semiconductor wafer.

Referring to FIG. 2, a cross-sectional view of a SOI semiconductor wafer 24 is shown. This wafer 24 is constructed in a sandwich structure consisting of a mechanically polished outer silicon layer 40, an internal silicon dioxide film 42, and a silicon wafer substrate 44. This sandwich structure creates three interfaces 46, 48, 50 from which light, incident upon the outer silicon layer 40 may be reflected. The reflectance characteristics of these interfaces 46, 48, 50 are based upon the intrinsic optical and physical properties of the semiconductor materials in each layer 40, 42, 44 of the SOI wafer 24. These properties consist of the absorption coefficient, $\alpha$, the index of refraction, n, and the thickness, t, of the material layers 40, 42, 44. For an SOI wafer, it is assumed that the absorption coefficient, $\alpha$, of the $SiO_2$ layer 42 is zero. However, in general, it is permissible that the absorption coefficient be non-zero, provided that it is known.

When the surface of the SOI wafer 46 is illuminated with collimated monochromatic light from beam 23, a series of coherent interactions occur as this light is reflected between the three material interfaces 46, 48 50 of the SOI structure 24. These interactions produce a wavelength dependent interference pattern that is visible upon the surface of the wafer. The reflectance at any point on the wafer is determined by the multiple reflections between the three surfaces and by the magnitudes of their physical properties, $n_1, \alpha_1, t_1$ and $n_2, \alpha_2, t_2$, as well as properties of the substrate ns, $\alpha_s$, where '$\alpha$' represents the absorption coefficient of each respective layer. In the unique case of an SOI wafer structure, the substrate indices are identical to those of the outer film indices ($n_s=n_2$, $\alpha_s=\alpha_2$) since both are fabricated from single crystal silicon. The wafer reflectance at any wavelength can be calculated explicitly as a function of the outer film thickness if all other parameters are known, however, the reverse problem of computing the thickness from a single measured reflectance is ambiguous. This ambiguity is created by the fact that as the outer film thickness is increased, the measured reflectance cycles between maximum and minimum values as the phase thickness ($n_2t_2$) increases by multiples of $\pi/4$. This multi-valued problem clearly makes the computation of the value of $t_2$ from a single reflectance measurement impossible. The use of multiple wavelength measurements can in principle overcome the multiple value problem but the wavelength dependent behavior of the material properties must be very accurately known otherwise large errors occur in the thickness computations.

An alternate approach is a statistical one where measured reflectance data at several wavelengths is compared on a least squares best fit basis with a library of computed spectral data at the same wavelengths. In the case of an SOI wafer, the library of spectra is computed for all values of the outer film thickness and the selection is made by choosing that outer film thickness which minimizes the least squares fit. This is for the case where all layer thicknesses are known except for one layer, typically the top layer.

Referring back to FIG. 1, a collimated light image of the interference fringe pattern is reflected off the surface of the SOI wafer 24 and returned through the third collimator lens 22. This third collimator lens 22 projects a condensed image of the reflected fringe pattern upon an off-axis mirror 26. This mirror 26 is positioned at a point 25 in the focal plane of the third collimator lens 22, alongside the position of the aperture image at focal point 21. The separation of these two focal points 21, 25 may be controlled with a slight lateral shift in the optical axis of the third collimator lens 22 with respect to the optical axis of the condensing lens 12 and the first two collimator lenses 16, 20. Equivalently, the wafer 24 may be tilted through a small angle, less than one degree, to achieve this same effect. This image separation scheme avoids the use of a beamsplitter which contains metallic coating with attendant optical losses.

The off-axis mirror 26 is used to redirect the reflected fringe pattern image from the wafer 24 to a final collimator lens 28. This final collimator lens 28 projects a collimated beam 29 containing an image of the fringe pattern onto a CCD camera detector array 31. It should be noted that the filter wheel assembly 18 may also be placed in this collimated beam 29 provided that the field angle, which is approximately fifteen times larger than the field angle in the collimated beam 23 illuminating the wafer 24, can be tolerated by the narrow band filters.

An alternate method of providing the reflected fringe pattern image to the CCD camera detector array 31 is shown in a dashed line block 61 in FIG. 1. An on-axis beamsplitter 60 is placed in the collimated light beam section 19 where the filter wheel assembly 18 is positioned. The beamsplitter 60 receives a collimated fringe pattern image from the second collimator lens 20 and reflects a portion 62 of this collimated beam to a final collimator lens 64. This final collimator lens 64 converges the fringe pattern image onto the CCD camera detector array 31. Although this alternate method results in optical losses which are inherent in beamsplitters, it does not require an image separation scheme which can introduce field angle errors in the collimated light beam 23 reflected from an off-axis SOI wafer 24. As with the previous method, the filter wheel assembly 18 may be placed in the collimated beam 62 reflected by the beamsplitter 60, provided that the field angle can be tolerated by the narrow band filters 17.

The determination of the method used to provide the reflected fringe pattern image to the CCD camera 30 is critically dependent upon the optical performance of the third collimator lens 22. When using the off-axis mirror method, the optical design of the third collimator lens 22 must possess an optimal off-axis performance quality and provide a minimal radial color distortion effect. Optimal off-axis performance minimizes the distortion effects associated with field angles that are created when the collimated light beam 23 is reflected from an off-axis non-uniform surface of a SOI wafer 24. Also, the need for a consistent fringe pattern image size at the CCD camera detector array 31 requires radial color distortion correction over the wavelength region of the incident monochromatic light. When the on-axis beamsplitter method is used, however, only the radial color distortion correction requirement applies since the field angles produced in the collimated light beam 23 reflected from an on-axis SOI wafer surface 46 are negligible. Therefore, if the returned fringe pattern image is distorted due to sub-optimal off-axis performance by the third collimator lens 22, then the off-axis mirror method is unsuitable and an on-axis beamsplitter 60 must be used.

Figure 3:
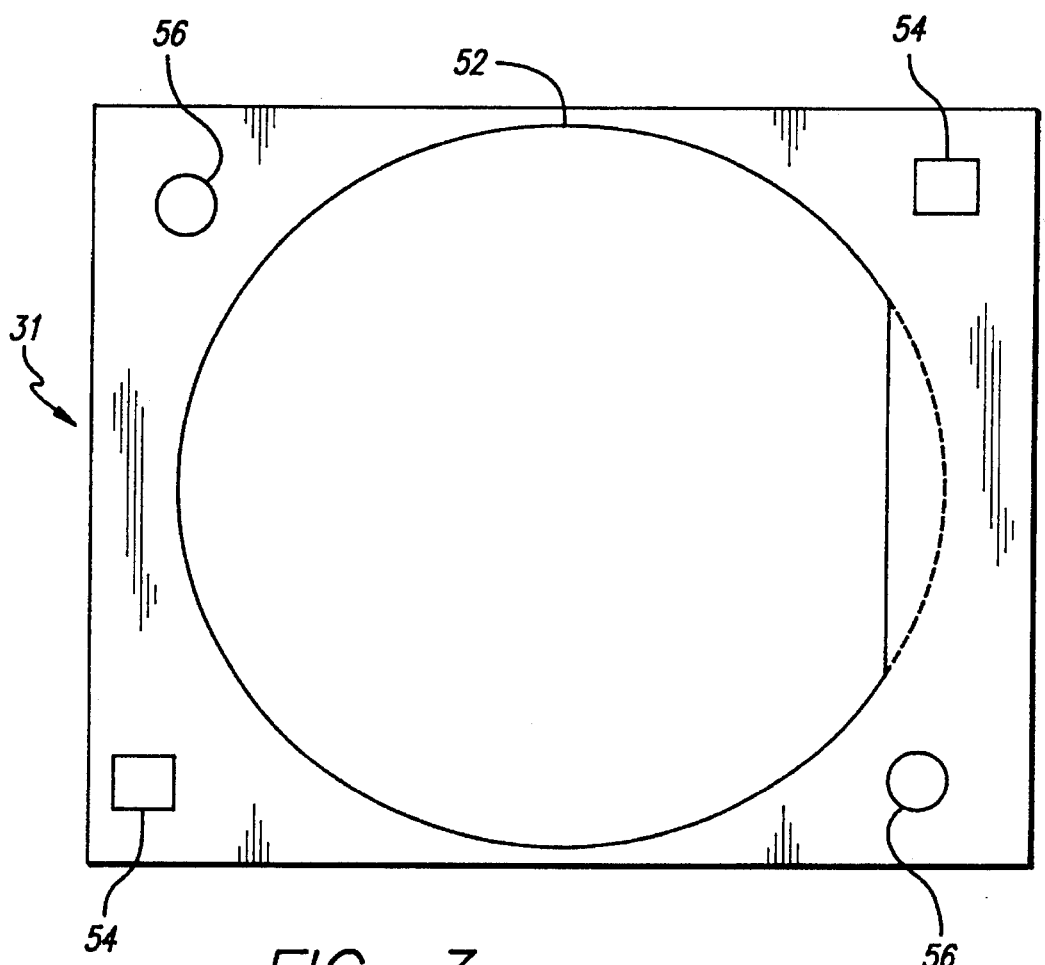
FIG. 3 is a plan view of a CCD camera detector array showing a wafer image outline and several reference surface image outlines.

Referring to FIG. 3, the CCD camera detector array 31 is shown with an image of a scaled SOI wafer outline 52, a pair of reference alignment images 54, and a pair of reference reflecting images 56, projected upon its surface. These reference images are formed by placing reference alignment marks and reference reflecting surfaces along the same plane as the surface of the SOI wafer 24. When illuminated with a collimated light beam 23 from the third collimator lens 22, these references provide reflections from their surfaces. Similar to the SOI wafer fringe pattern, images of these reflected references are returned through the third collimator lens 22 and are eventually projected upon the CCD camera detector array 31. The reference alignment marks provide aid in wafer alignment whereas the reference reflecting surfaces serve to normalize the CCD signals so that actual wafer reflectances can be calculated. Other wafer alignment techniques may be used without departing from the scope of the present teachings.

Referring back to FIG. 1, the collimated beam 29 formed by the final collimator lens 28 contains an image of the reflected fringe pattern. This image is projected upon the CCD camera detector array 31 and captured by the CCD camera 30. A reflectance map is generated by digitizing the CCD pixel signals corresponding to the projected fringe pattern image with a digitizing circuit 34. This raw reflectance data may be normalized to eliminate variations in pixel sensitivity and may be reduced in size by averaging signals over blocks of pixels to match the spatial limitations of the subsequent chemical micro-polishing process. In determining the thickness, $t_2$, of the outer silicon layer of the SOI wafer 24, either a numerical computation method or a SOI calibration wafer may be used. Both of these methods require the use of a computer 36.

The numerical method of determining outer silicon layer thickness, $t_2$ consists of assuming values for the thin film constants $n_1$, $\alpha_1$, $t_1$, $n_2$, $\alpha_2$, $n_3$, and $\alpha_3$ and calculating spectral reflectances for a set of wavelengths corresponding to the monochromatic light produced by the filtered white light source. This calculation is done for a number of different outer layer thicknesses, $t_2$, and provided that the initial thin film constant assumptions are correct should only need to be computed once. This calculation provides sets of reflectance values, $R_c(\lambda_1, \lambda_2, \ldots \lambda_n, t_2)$ for thicknesses ranging from the thinnest to the thickest estimated value of the outer silicon layer. These computed spectral reflectances are stored in a reference library and then compared with the measured reflectance data, $R_m(\lambda_1, \lambda_2, \ldots \lambda_n, t_2)$, at specific points on the wafer using a root mean square (rms) merit function of the form $$M(x,y,t_2) = \left[ \frac{1}{n\max} \left[ \sum_{n=1}^{n\max} [R_m(\lambda_n, t_2) - R_c(\lambda_n, t_2)]^2 \right] \right]^{1/2}$$

This merit function is evaluated for different values of $t_2$ until a minimum or best match is found, which in turn indicates the most likely thickness. It is, of course, apparent that other pattern matching merit functions can be used, if desired.

Unknown variations in any of the assumed thin film constants may cause errors to propagate through the computation process as outer layer thickness errors. Such first order error sources include the lack of knowledge of the $SiO_2$ inner film thickness, $t_1$, over the wafer aperture and the dispersive effects of the silicon index of refraction, $n_1$. If the value of the merit function is too large, indicating a poor match, then new computed spectral reflectances will have to be generated for a closer set of $t_2$ thicknesses, iterated with the absorption coefficients $\alpha_2$, $\alpha_3$, and the indices of refraction $n_2$, $n_3$, of the outer silicon layer 40 and the silicon substrate 44 respectively, or the index of refraction, $n_1$, and the thickness, $t_1$ of the $SiO_2$ layer 42.

In short, the above-described technique for determining the thickness of a layer of material in a stack where the thickness of the other layers is known is as follows. First, the film stack reflectivity is measured as a function of incident wavelength for a large number of physical locations. The "signature" of reflectivity vs wavelength is then compared to a library of such signatures, each generated from theoretical predictions for a slightly different thickness of one layer in the stack. A "signature" is simply a set of numbers which represents the reflectivity of one physical point on the wafer for a number of discrete wavelengths of incident light. The library is normally generated with a fixed thickness for all other films in the stack. The best match to this library is determined by minimizing the least squares error therebetween. The library is structured as a sequence of signatures representative of film thickness stored end-to-end, from smallest to longest thickness. In the illustrative embodiment, each signature is the same length, hence we can access any signature by calculating its position or offset in the file. However, in accordance with the present teachings, the signatures could be different lengths.

In any event, the present invention extends this technique by providing a method for simultaneously determining the thickness of two layers of thin film material. In accordance with the present invention, one of the layers is assumed to be of substantially uniform thickness relative to the other. The other layer is permitted to vary in thickness considerably.

Thus, the technique of the present invention is as follows. First a reference library of reflectivity vs wavelength is generated for a range of say 1000 thicknesses of one layer of film in the stack 40. The thickness of the second layer 42 is assumed to be uniform and is fixed at some arbitrary but plausible value for the sake of calculating the reflectivity of the stack theoretically. The experimental data of reflectivity versus wavelength is then acquired at a large number (e.g., 1000) of points on the stack and each signature is matched to the library. A least square error is provided between each entry in the library and the measured signatures. Thus, the average least squares error is calculated from the best match of each signature to the library. (Those skilled in the art will appreciate that techniques other than the average least squares error may be used to evaluate the match of the signature to the library. For example, the kth-nearest neighbor and maximum likelihood techniques may be used for this purpose.) This average least squares error is intrinsically a measure of how well the actual thickness of the second layer 42 matches the arbitrary value selected for generating the reference library.

A slightly different thickness is now selected for the second layer 42 (e.g., $\Delta t=0.01$ μm) and a new theoretical library is generated. The average least squares error is once again determined. As the estimated thickness of the second layer 42 approaches the actual thickness of the second layer 42 in the film stack, the average least squares error approaches a minimum. When the minimum has been found through iteration, the optimum library represents the most likely estimate of the thickness of the second layer 42. Thereafter, the best matches of each experimental signature yields the thickness of the first layer 40 at each point.

FIG. 4 is a plot of average least squares error as a function of estimated oxide thickness in an SOI wafer. The minimum occurs for an oxide (second layer) thickness of 1.0 μm.

The procedure can be thought of as a two-dimensional optimization. It relies on the fact that each parameter (e.g., film thickness of the two layers) can be varied in the reference library independently.

In the case of the optically transparent film stack, an ambiguity can exist in the determination of the best library match for a given experimental signature. This ambiguity derives in part from the cyclical nature of net reflectance from a multilayer film stack as the thickness of one of the layers (e.g., the first layer 40) changes. The present invention appears operative in spite of the ambiguity because the consistent uniformity of the second layer 42 yields the same contribution to the signature for each location on the stack, whereas the varying thickness of the first layer 40 (and concomitant variation in reflectivity for a given wavelength) tends to "wash out" the ambiguity. The result is that, statistically, the average least squares error tends toward a minimum as the estimate of thickness of the second layer 42 approaches the actual thickness thereof, even though the individual experimental signatures are not precisely matched to the candidates in the reference library.

Thus, the present invention has been described herein with reference to a particular embodiment for a particular application. Those having ordinary skill in the art and access to the present teachings will recognize additional modifications applications and embodiments within the scope thereof. For example, the invention is not limited to use to measure thickness. The technique of the present invention may be extended and used to determine the index of refraction of a film by iterating over the index in a narrow range as the thickness is held constant in the reference library.

It is therefore intended by the appended claims to cover any and all such applications, modifications and embodiments within the scope of the present invention.

What is claimed is:

1. A system for measuring the thicknesses of a first layer and a second layer of materials, one of the layers having a substantially uniform thickness, said system comprising:

first means for providing a first library of theoretical signatures of reflectivity as a function of wavelength for a range of thicknesses of said first layer on the basis of a first assumed thickness of said second layer;

second means for measuring reflectivity as a function of wavelength for said first layer at a plural points on the surface of said first layer to provide a plurality of signatures representing the measured value of reflectivity as a function of wavelength at each point measured;

third means for comparing each of said measured signatures to each of said theoretical signatures in said first library to identify an associated optimal correlation for each measured signature;

fourth means for calculating an error value associated with each optimal correlation of each signature with one of said theoretical signatures in said first library; and fifth means for analyzing the error value associated with each optimal correlation of each signature with one of said theoretical signatures in said first library to provide a first measure of a quality of a correlation between the actual thickness of said second layer and the first assumed thickness of the second layer.

2. The system as set forth in claim 1 wherein said first means provides a set of libraries of theoretical signatures of reflectivity as a function of wavelength for a range of thickness of said first layer, wherein each library in said set is based upon a unique assumed thickness of said second layer.

3. The system as set forth in claim 2 wherein said fifth means iteratively analyzes the error value associated with each optimal correlation of each signature with one of said theoretical signatures in said each library in said set to provide a measure of the correlation between the actual thickness of said second layer and each assumed thickness of the second layer.

4. The system as set forth in claim 3 wherein said fifth means identifies the library based upon the most likely estimate of the thickness of the second layer.

5. The system as set forth in claim 4 wherein said fourth means includes means for calculating a least squares error.

6. The system as set forth in claim 5 wherein said fifth means includes means for computing the average of said least squares error.

7. The system as set forth in claim 6 wherein said fifth means includes means for determining the minimum average least squares error and said fifth means identifies the library based upon the most likely estimate of the thickness of the second layer from said minimum average least squares error.

8. A method for measuring the thicknesses of a first layer and a second layer of materials, one of the layers having a substantially uniform thickness, said method including the steps of:

providing a first library of theoretical signatures of reflectivity as a function of wavelength for a range of thicknesses of said first layer on the basis of a first assumed thickness of said second layer;

measuring reflectivity as a function of wavelength for said first layer at plural points on the surface of said first layer to provide a plurality of signatures representing the measured value of reflectivity as a function of wavelength at each point measured;

comparing each of said measured signatures to each of said theoretical signatures in said first library to identify an associated optimal correlation for each measured signature;

calculating an error value associated with each optimal correlation of each signature with one of said theoretical signatures in said first library; and analyzing the error value associated with each optimal correlation of each signature with one of said theoretical signatures in said first library to provide a first measure of the correlation between the actual thickness of the second layer and the first assumed thickness of the second layer.

9. The method as set forth in claim 8 wherein said measuring step is repeated for a plurality of assumed thicknesses of the second layer to provide a plurality of sets of signatures.

10. The method as set forth in claim 9 wherein said comparing step includes comparing each set of said measured signatures to theoretical signatures in a set of libraries of theoretical signatures, wherein each library is based upon a unique assumed thickness of said second layer.

11. The method as set forth in claim 10 wherein said calculating step includes calculating an error value associated with each signature.

12. The method as set forth in claim 11 wherein said analyzing step includes analyzing the error value associated with each signature to provide a measure of the correlation between the actual thickness of the second layer and each assumed thickness of the second layer.

13. The method as set forth in claim 12 wherein said analyzing step includes the step of calculating a least squares error.

14. The method as set forth in claim 13 wherein the step of calculating a least squares error is followed by the step of computing the average of said least squares error.

15. The method as set forth in claim 14 wherein the step of computing the average of said least squares error is followed by the steps of determining the minimum average least squares error and identifying the library based upon the most likely estimate of the thickness of the second layer from said minimum average least squares error.

* * * * *